US012771883B2

(12) United States Patent
Ten

(10) Patent No.: US 12,771,883 B2
(45) Date of Patent: Oct. 20, 2026

(54) SINGLE CHANNEL ENCODING INTO A MULTI-CHANNEL CONTAINER FOLLOWED BY IMAGE COMPRESSION

(71) Applicant: DOLBY LABORATORIES LICENSING CORPORATION

(72) Inventor: Arkady Ten, Sunnyvale, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 19/112,460

(22) PCT Filed: Sep. 14, 2023

(86) PCT No.: PCT/US2023/032786

§ 371 (c)(1),
(2) Date: Mar. 17, 2025

(87) PCT Pub. No.: WO2024/064014

PCT Pub. Date: Mar. 28, 2024

(65) Prior Publication Data

US 2026/0019649 A1 Jan. 15, 2026

Related U.S. Application Data

(60) Provisional application No. 63/407,885, filed on Sep. 19, 2022.

(30) Foreign Application Priority Data

Jan. 16, 2023 (EP) .................................... 23151686

(51) Int. Cl.
*H04N 19/186* (2014.01)
*H04N 19/88* (2014.01)

(52) U.S. Cl.
CPC ........... *H04N 19/88* (2014.11); *H04N 19/186* (2014.11)

(58) Field of Classification Search
None
See application file for complete search history.

(56) References Cited

U.S. PATENT DOCUMENTS 6,256,038 B1 * 7/2001 Krishnamurthy ....... G06T 11/23 345/582
2007/0242067 A1 * 10/2007 Sharma .................. G06T 17/20 345/423
(Continued)

FOREIGN PATENT DOCUMENTS

GB 2562490 A 11/2018
JP 2015531186 A 10/2015
(Continued)

*Primary Examiner* — Christopher G Findley

(57) ABSTRACT

Coding methods and apparatus for packing single-channel data into a multi-channel container, e.g., an MP4, TIFF, or JPEG container, to at least achieve good utilization of the container's data capacity. In some examples, a coding method comprises: converting a plurality of scalar values of a received data stream into a corresponding plurality of n-dimensional values, the converting being performed using a mapper; assigning each of the n-dimensional values as a pixel value to a respective pixel of a virtual-image frame, where n is an integer greater than one; and compressing the virtual-image frame according to a type of a container for image data. The mapper is configured to map a scalar value to a corresponding n-dimensional value based on a relationship represented by an n-dimensional curve or by a plurality of $2^n$-way tree partitions of n-dimensional space.

16 Claims, 8 Drawing Sheets

(56) References Cited

U.S. PATENT DOCUMENTS

| | | | | |
|---|---|---|---|---|
| 2010/0053186 | A1* | 3/2010 | DeRose | G06T 13/40 345/581 |
| 2011/0122225 | A1 | 5/2011 | Kim | |
| 2014/0029670 | A1 | 1/2014 | Kung | |
| 2015/0317818 | A1* | 11/2015 | Howson | G06T 1/20 345/424 |
| 2016/0014420 | A1 | 1/2016 | Su | |
| 2017/0111643 | A1 | 4/2017 | Bugdayci Sansli | |
| 2019/0272665 | A1* | 9/2019 | X | G06T 15/08 |
| 2020/0105179 | A1 | 4/2020 | Greenebaum | |
| 2020/0217937 | A1* | 7/2020 | Mammou | G01S 17/42 |
| 2022/0222541 | A1* | 7/2022 | Matlage | G06N 3/105 |
| 2022/0402038 | A1* | 12/2022 | Tourangeau | B22F 10/80 |
| 2026/0019606 | A1* | 1/2026 | Ahn | G06T 9/002 |

FOREIGN PATENT DOCUMENTS

| | | | |
|---|---|---|---|
| JP | 2025536502 | A | 11/2025 |
| WO | 2022103902 | A1 | 5/2022 |
| WO | 2022131948 | A1 | 6/2022 |

* cited by examiner

2 BITS PER DIMENSION

SINGLE CHANNEL ENCODING INTO A MULTI-CHANNEL CONTAINER FOLLOWED BY IMAGE COMPRESSION

1. CROSS-REFERENCE TO RELATED APPLICATIONS

This application is a U.S. National Stage application under U.S.C. 371 of International Application No. PCT/US2023/032786, filed on Sep. 14, 2023, which claims the benefit of priority from U.S. Provisional Application No. 63/407,885 filed on 19 Sep. 2022, and European Application No. 23151686.5 filed on 16 Jan. 2023, each of which is incorporated by reference herein in its entirety.

2. FIELD OF THE DISCLOSURE

Various example embodiments relate generally to video/image compression and, more specifically but not exclusively, to video/image encoding and decoding.

3. BACKGROUND

Compression enables reduction of the amounts of memory needed to store videos/images and of bandwidth needed to transport the same. The Motion Picture Experts Group (MPEG) codec, based on the H.264 compression standard, is an example codec used for this purpose. Other codecs are also available in the marketplace. Many of the codecs are designed to be compatible with a variety of professional, consumer, and mobile-phone cameras.

BRIEF SUMMARY OF SOME SPECIFIC EMBODIMENTS

Disclosed herein are various methods and apparatus for packing single-channel data into a multi-channel container, e.g., an MP4, TIFF, or JPEG container, to at least achieve good utilization of the container's data capacity. In various embodiments, the packing is performed based on a mapping relationship represented by an n-dimensional curve or by a plurality of $2^n$-way tree (e.g., octree for n=3) partitions of n-dimensional space. At least some embodiments are compatible with the existing hardware of a legacy video/image delivery pipeline, i.e., do not inherently rely on any hardware/infrastructure modifications thereof. Rather, such embodiments can advantageously be implemented in software and/or firmware, e.g., by interfacing the corresponding add-on data-processing modules with the existing codec, without altering the codec's native container format(s).

According to an example embodiment, provided is a coding method, comprising: converting, with a processor, a plurality of scalar values of a received data stream into a corresponding plurality of n-dimensional values, the converting being performed using a mapper; assigning, with the processor, each of the n-dimensional values as a pixel value to a respective pixel of a virtual-image frame, where n is an integer greater than one; and compressing, with the processor, the virtual-image frame according to a type of a container for image data; and wherein the mapper is configured to map a scalar value to a corresponding n-dimensional value based on a relationship represented by an n-dimensional curve or by a plurality of $2^n$-way tree partitions of n-dimensional space.

According to another example embodiment, provided is a non-transitory computer-readable medium storing instructions that, when executed by an electronic processor, cause the electronic processor to perform operations comprising the above method.

According to yet another example embodiment, provided is an apparatus for coding image data, the apparatus comprising: at least one processor; and at least one memory including program code; wherein the at least one memory and the program code are configured to, with the at least one processor, cause the apparatus at least to: convert, with an electronic mapper, a plurality of scalar values of a received data stream into a corresponding plurality of n-dimensional values; assign each of the n-dimensional values as a pixel value to a respective pixel of a virtual-image frame, where n is an integer greater than one; and compress the virtual-image frame according to a type of a container for the image data; and wherein the electronic mapper is configured to map a scalar value onto a corresponding n-dimensional value based on a relationship represented by an n-dimensional curve or by a plurality of $2^n$-way tree partitions of n-dimensional space.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

This disclosure and aspects thereof can be embodied in various forms, including hardware, devices or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing is intended solely to give a general idea of various aspects of the present disclosure, and does not limit the scope of the disclosure in any way.

Figure 1:
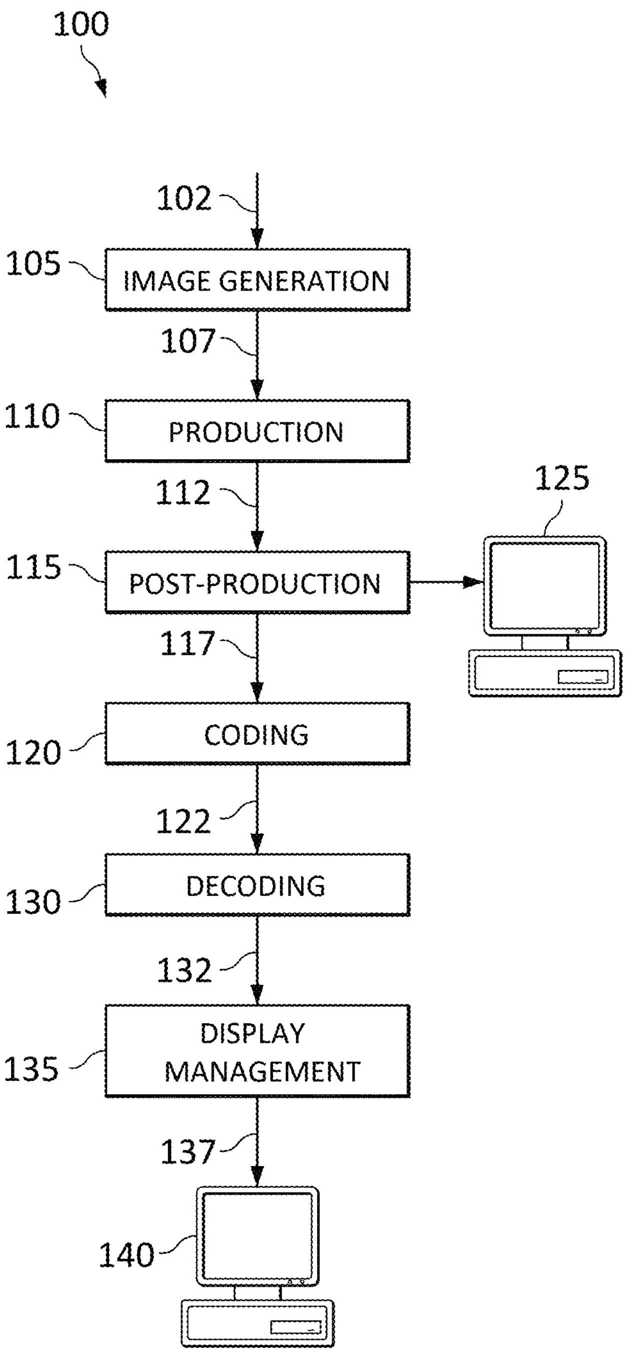
FIG. 1 depicts an example process for a video/image delivery pipeline.

FIG. 1 depicts an example process of a video/image delivery pipeline 100, showing various stages from video/image capture to video/image-content display according to an embodiment. A sequence of video/image frames 102 may be captured or generated using an image-generation block 105. The frames 102 may be digitally captured (e.g., by a digital camera) or generated by a computer (e.g., using computer animation) to provide video and/or image data 107. Alternatively, the frames 102 may be captured on film by a film camera. Then, the film may be scanned and converted into a digital format to provide the video/image data 107.

In a production phase 110, the data 107 may be edited to provide a video/image production stream 112. The data of the video/image production stream 112 may be provided to a processor (e.g., one or more processors, such as a central processing unit, CPU, and the like) at a post-production block 115 for post-production editing. The post-production editing of the block 115 may include, e.g., adjusting or modifying colors or brightness in particular areas of an image to enhance the image quality or achieve a particular appearance for the image in accordance with the video creator's creative intent. This part of post-production editing is sometimes referred to as "color timing" or "color grading." Other editing (e.g., scene selection and sequencing, image cropping, addition of computer-generated visual special effects, removal of artifacts, etc.) may be performed at the block 115 to yield a "final" version 117 of the production for distribution. During the post-production editing 115, video and/or images may be optimized for viewing on a reference display 125.

Following the post-production 115, the data of the final version 117 may be delivered to a coding block 120 for being further delivered downstream to decoding and playback devices, such as television sets, set-top boxes, movie theaters, and the like. In some embodiments, the coding block 120 may include audio and video encoders, such as those defined by the ATSC, DVB, DVD, Blu-Ray, and other delivery formats, to generate a coded bitstream 122. In a receiver, the coded bitstream 122 is decoded by a decoding unit 130 to generate a corresponding decoded signal 132 representing a copy or a close approximation of the signal 117. The receiver may be attached to a target display 140 that may have somewhat or completely different characteristics than the reference display 125. In such cases, a display management (DM) block 135 may be used to map the decoded signal 132 to the characteristics of the target display 140 by generating a display-mapped signal 137. Depending on the embodiment, the decoding unit 130 and display management block 135 may include individual processors or may be based on a single integrated processing unit. Various embodiments disclosed herein below can be used to implement the coding block 120 and/or the decoding unit 130.

A codec used in the coding block 120 and/or the decoding unit 130 enables video/image data processing and compression/decompression. The compression is used in the coding block 120 to make the corresponding file(s) smaller. The decoding process carried out by the decoding unit 130 typically includes decompressing the received video/image data file(s) into a form usable for playback and/or further editing. Example codecs that can be used in the coding block 120 and the decoding unit 130 include but are not limited to XviD/DivX codecs, MPEG codecs, and H.264 codecs.

A container is a digital file that contains video/audio data and any corresponding metadata organized into a single package. The metadata may include subtitles, resolution information, creation date, device type, language information, and the like. The container file interleaves the different data types in a manner that makes the components thereof readily accessible to the decoding unit 130. Different types of containers are typically identified by their respective file extensions, which include MP4, WAV, AIFF, AVI, MOV, WMV, MKV, TIFF, JPEG, HEVC, FLV, F4V, SWF, and more.

For example, the JPEG image file format is a popular choice for storing and transmitting photographic images, e.g., still images and individual video frames. Many operating systems have viewers that support visualization of JPEG image files, which are stored with the JPG or JPEG extension. Many web browsers also support visualization of JPEG image files. JPEG encoding typically includes the following operations:

(1) Transformation: color images are transformed from the RGB (Red, Green, Blue) color space into a luminance/chrominance space.

(2) Down Sampling: the down sampling is typically done for the chrominance components but not for the luminance component. For example, down sampling can be done for the image frame at a ratio 2:1 horizontally and 1:1 vertically (2h 1v).

(3) Organizing in Groups: the pixels of each color component are organized in groups of 8×8 pixels, often referred to as "data units." If the number of rows is not an integer multiple of 8, then the bottom row is duplicated one or more times to achieve the needed multiplicity. Similar duplication may also be applied to the rightmost column.

(4) Discrete Cosine Transformation (DCT): the DCT is applied to each data unit to create an 8×8 map of transformed components. The DCT typically involves some loss of information due to the limited precision of the machine-based arithmetic.

(5) Quantization: each of the 64 transformed components in the data unit is divided by a separate number referred to as the Quantization Coefficient (QC) and then rounded to an integer. This operation typically causes additional loss of information. Large QC values tend to cause more loss. Many encoders rely on the QC tables recommended in the JPEG standard for quantization.

(6) Encoding: the 64 quantized transformed coefficients (which are now integers) of each data unit are encoded using a combination of run-length encoding (RLE) and Huffman coding.

(7) Header: the last operation adds a header listing all relevant JPEG parameters therein.

The corresponding JPEG decoder uses inverse operations to generate an image that closely approximates the originally encoded image.

As another example, TIFF image frames are made up of rectangular grids of pixels. The two axes of this geometry are termed horizontal (or X, or width) and vertical (or Y, or length). Horizontal and vertical resolution need not be equal. A baseline TIFF image divides the vertical range of the image into one or more strips, which are encoded and compressed individually (separately). The TIFF format is an alternative to tiled image formats, in which both the horizontal and the vertical ranges of the image are divided into smaller units. The data for one pixel include one or more samples. For example, an RGB image typically has one Red sample, one Green sample, and one Blue sample per pixel, whereas a greyscale image has only one sample per pixel. The TIFF format can be used with both additive (e.g. RGB) and subtractive (e.g. Cyan, Magenta, Yellow, Black, or CMYK) color models. In at least some examples, interpretation of the channel data is external to the TIFF container. The interpretation can be aided by metadata, such as, for example, the International Color Consortium (ICC) profile. The TIFF format does not constrain the number of samples per pixel, nor does it constrain how many bits are encoded for each sample. For example, three samples per pixel is at the low end of multispectral imaging supported by TIFF, whereas hyperspectral imaging (also supported by TIFF) may use one hundred or more samples per pixel. Support for the custom selection of the number of samples per pixel in the TIFF format is leveraged in at least some embodiments disclosed herein below. TIFF images may be uncompressed, compressed using a lossless compression scheme, or compressed using a lossy compression scheme. An example of a lossless compression scheme compatible with the TIFF format is the LZW (Lempel-Ziv-Welch) compression scheme.

Augmented reality (AR) applications, virtual reality (VR) applications, and various applications involving rendering of 3-dimensional (3D) scenes may typically generate additional image-data streams, each of which may take the form of a corresponding data sequence transmitted via a corresponding dedicated data channel. Examples of such data streams include but are not limited to depth data, vertex data, and index data. However, many of the above-mentioned types of containers (file formats) and the corresponding conventional hardware for the coding block 120 and the decoding unit 130 do not innately support single-channel transport, which disadvantageously creates difficulties for efficient encoding/decoding and compression/decompression of the above-mentioned additional data streams.

Various embodiments disclosed herein address at least some of the above-indicated problems in the state of the art by providing various schemes for packing single-channel data into multi-channel containers to achieve one or more of: (i) efficient utilization of the multi-channel container's data capacity; (ii) preservation of the spatial and/or temporal coherency of the single-channel data stream in the packed form; and (iii) inhibition or avoidance of excessive compression artifacts in the decompressed single-channel data at the decoder unit 130. At least some embodiments are fully compatible with the existing hardware of the corresponding video/image delivery pipeline (such as 100, FIG. 1), i.e., do not inherently rely on any hardware/infrastructure modifications thereof. Instead, such embodiments can advantageously be implemented in software and/or firmware, e.g., by interfacing with the existing codec the corresponding relatively small data-processing modules, without altering the codec's native container format(s).

Figure 2:
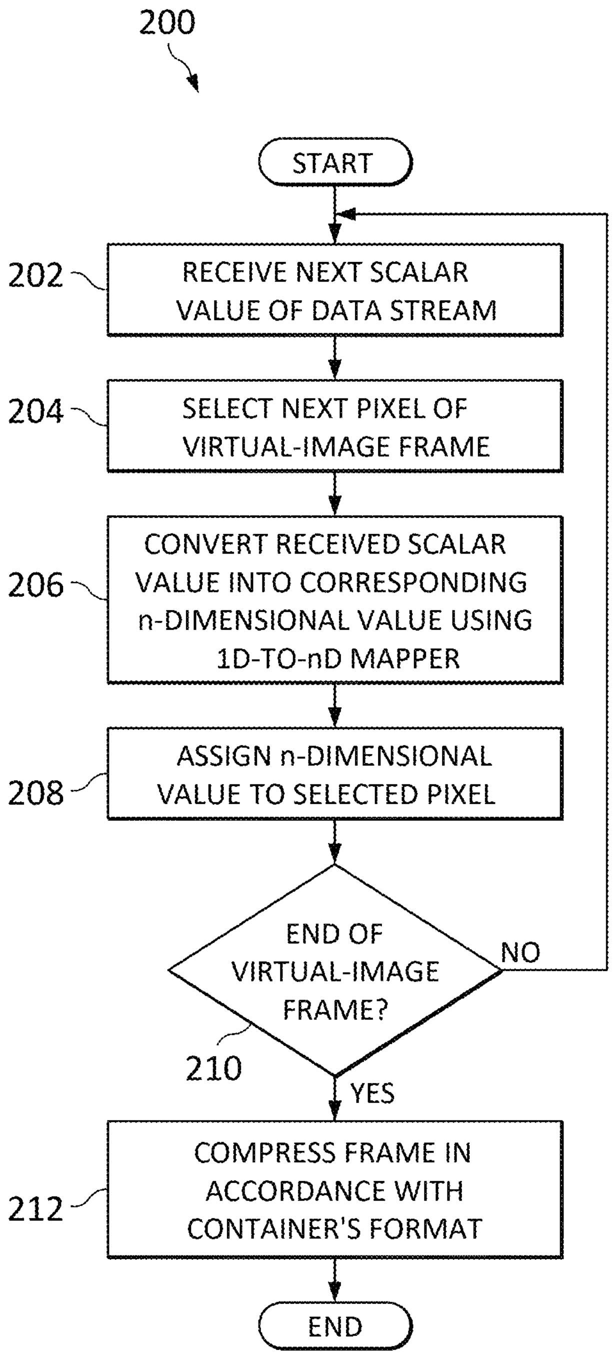
FIG. 2 is a flowchart of an encoding method that can be used in the video/image delivery pipeline of FIG. 1 according to an embodiment.

FIG. 2 is a flowchart of an encoding method 200 that can be used in the coding block 120 according to an embodiment. The encoding method 200 enables encoding of a single-channel data stream (e.g., a data sequence) into an n-channel container, where n is an integer greater than one. The single-channel data stream can be, for example, the depth data stream corresponding to a 3D scene. The n-channel container can be, for example, one of the multi-channel containers mentioned above.

The encoding method 200 comprises receiving a next value of the single-channel data stream (in block 202). For the first instance of the block 202, the received next value is the first value of the stream. For any subsequent instance of the block 202, the received next value is the value of the stream that follows the previously received value.

The encoding method 200 also comprises selecting a next pixel of a virtual-image frame (in block 204). Herein, the term "virtual-image frame" refers to an image frame that is analogous to a conventional image frame. However, unlike the latter, a virtual-image frame does not represent a conventional image. Instead, different pixels of the virtual-image frame can be assigned any desired pixel values, e.g., values generated by a suitable mapper (e.g., see block 206 and FIGS. 3-5). The pixels in such virtual-image frame can be spatially arranged in the same manner as in a conventional image frame, e.g., in a rectangular array having the pixels thereof in rows and columns.

In some examples, in the first instance of the block 204, the top-left corner pixel of the frame is selected. In any subsequent instance of the block 204, the selection process may follow a raster pattern, or any other suitable predetermined pattern. The processing of the whole virtual-image frame in the encoding method 200 typically concludes after each of the frame's pixels has been selected once. For example, with the raster pattern, the pixel selected in the last instance of the block 204, can be the frame's bottom-right corner pixel.

In other examples, pixel processing orders other than the above-indicated sequential order are also used. In one example, random pixel selection is implemented. In various additional examples, the pixels of the virtual-image frame are processed in parallel within single instruction, multiple data (SIMD) vectorization; multiple instruction, multiple data (MIMD) multithreading; or a combination of thereof. Such alternatives can also be implemented in various examples of the decoding method 600 (see FIG. 6).

The encoding method 200 also comprises converting (in the block 206) the 1D (1-dimensional, scalar) value received in the block 202 into a corresponding n-dimensional (nD) value using the selected 1D-to-nD mapper. In some specific examples, an nD value can be represented by a vector in an nD space. In the Cartesian coordinate system, an origin-based vector v in the nD space is represented by a string of values ($x_1$, $x_2$, . . . , $x_n$), where $x_i$ is the length of the projection of the vector v onto the coordinate axis corresponding to the i-th dimension of the nD space. The number n is an algorithm parameter that depends on the container used in the encoding method 200. For example, for the JPEG and MP4 containers, the number n is n=3. For the TIFF container, the number n is the number of samples per pixel, which can be n>3 in at least some examples, as explained above. Several non-limiting examples of 1D-to-nD mappers that can be used in the block 206 are described in more detail below in reference to FIGS. 3-5.

The encoding method 200 also comprises assigning (in block 208) the nD value generated in the block 206 to the pixel selected in the block 204. For example, for n=3 and containers supporting the RGB color scheme, the $x_1$, $x_2$, and $x_3$ components of the corresponding 3D vector are assigned to the selected pixel as the pixel's R, G, and B values, respectively (in the block 208). As another example, for n=16 and the TIFF container, the $x_1$, $x_2$, . . . , $x_{16}$ components of the corresponding 16D vector are assigned to the pixel as the respective 16 samples corresponding to multispectral imaging (in the block 208). Other suitable assignment schemes may also be used in other examples of the block 208.

The encoding method 200 also comprises determining (in decision block 210) whether or not the end of the corresponding virtual-image frame has been reached. When it is determined that the end of the frame has not been reached ("No" at the decision block 210), operations of the encoding method 200 loop back to the block 202. Otherwise ("Yes" at the decision block 210), the (fully pixel-assigned) virtual-image frame is compressed in a conventional manner in accordance with the container format (in block 212). The container may then be directed from the coding block 120 to the decoding unit 130 as previously described (also see FIG. 1). Upon completing the operations of the block 212, the encoding method 200 is terminated.

Figure 3:
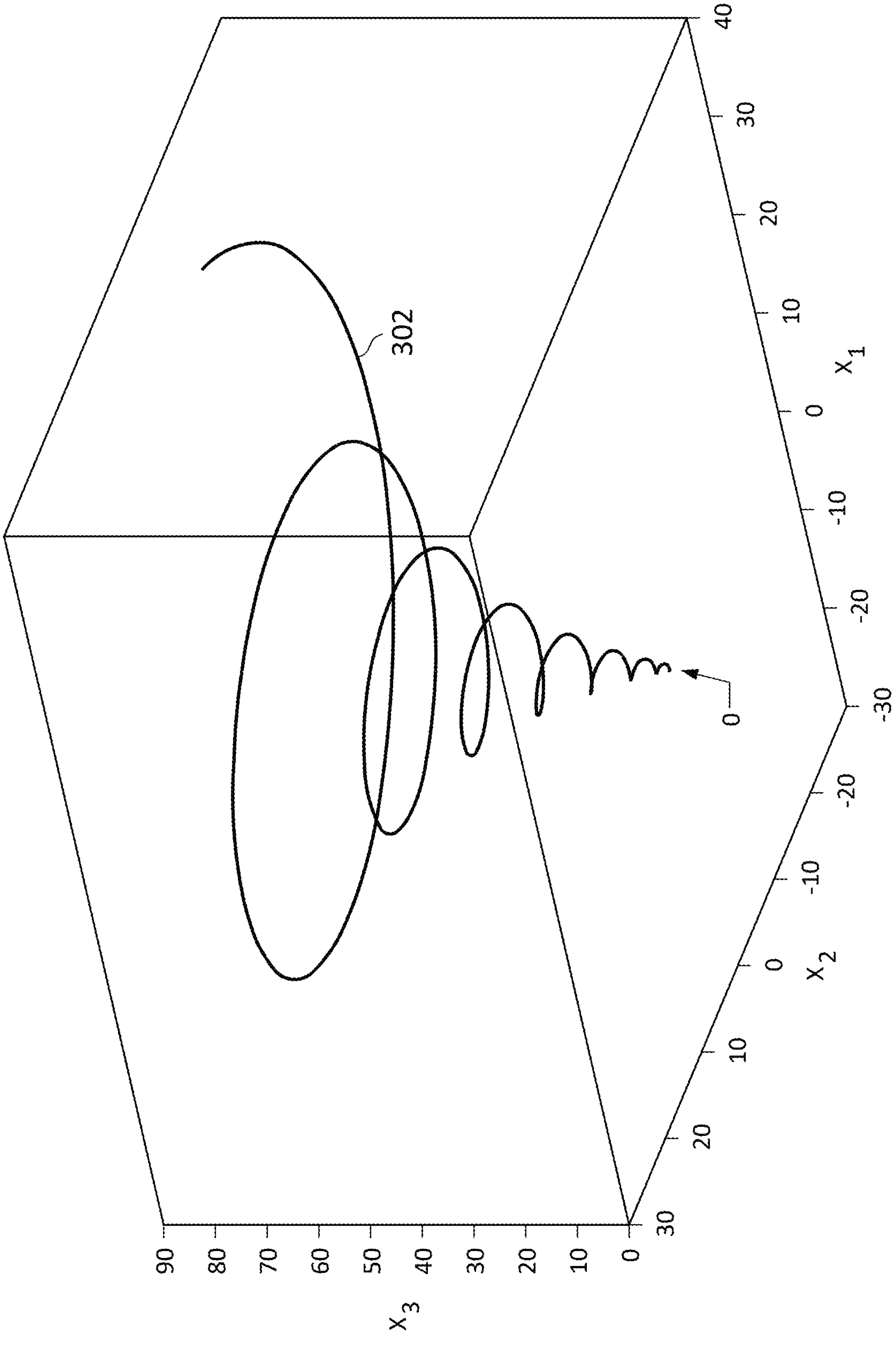
FIG. 3 graphically illustrates the principle of operation of a 1D-to-3D mapper that can be used in the encoding method of FIG. 2 according to an embodiment.
Figure 4:
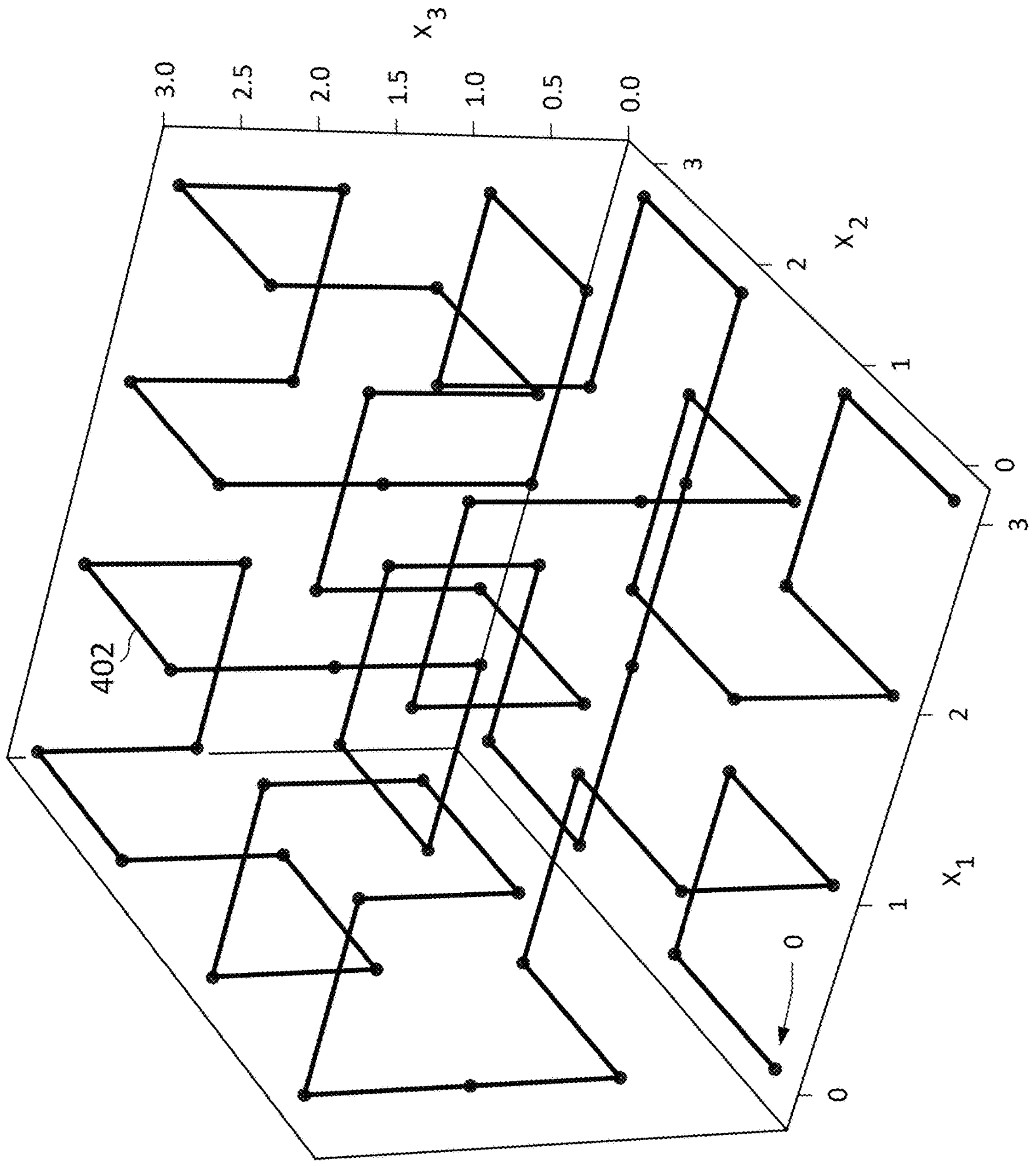
FIG. 4 graphically illustrates the principle of operation of a 1D-to-3D mapper that can be used in the encoding method of FIG. 2 according to another embodiment.

FIGS. 3-5 illustrate several non-limiting examples of 1D-to-nD mappers that can be used in the block 206 of the encoding method 200 according to various embodiments. For ease of presentation and without any implied limitations, the illustrated examples correspond to the number n=3. Based on the provided description, a person of ordinary skill in the pertinent art will be able to make and use various 1D-to-nD mappers corresponding to other values of n, e.g., n=2 and n>3, without any undue experimentation. In at least some examples, the corresponding 1D-to-nD mapper is implemented using one or more lookup tables (LUTs).

FIG. 3 graphically illustrates the principle of operation of a 1D-to-3D mapper that can be used in the block 206 of the encoding method 200 according to an embodiment. More specifically, FIG. 3 shows a 3D logarithmic spiral 302 in a Cartesian coordinate system whose coordinate axes are labeled $X_1$, $X_2$, and $X_3$, respectively. The spiral 302 can be used to map a range [0, D] of scalar values d onto 3D vectors (Y, Cb, Cr), where Y, Cb, and Cr denote the luminance, blue-difference chroma component, and red-difference chroma component, respectively.

In some examples, a scalar value d (D≥d≥0) is mapped onto the spiral 302 by finding the point on the spiral whose distance along the spiral, from the spiral's origin O, is d. The cartesian coordinates ($x_3$, $x_2$, $x_1$) of the found point are then used to determine the corresponding values of Y, Cb, and Cr, respectively. In some specific instances, the following Eqs. (1)-(3) are used to program a processor of the coding block 120 to perform the corresponding computations on the fly in the block 206 of the encoding method 200:

$$Cr = e^{(b\times d)}\cos(a\times d) - 1 - Cr_0 \quad (1)$$

$$Cb = e^{(b\times d)}\sin(a\times d) - Cb_0 \quad (2)$$

$$Y = F(d) \quad (3)$$

where a and b are parameters that determine how the spiral 302 grows in radius; $Cr_0$ and $Cb_0$ are (offset) constants; and F(d) is a function of d that determines the distance scale along the Y (luminance) axis. In some specific examples, the function F(d) is a quadratic function of d. In some other specific instances, Eqs. (1)-(3) are used to precompute a corresponding LUT, which is then accessed by the processor to perform the corresponding operations in the block 206.

When the mapping performed in the block 206 is implemented based on the spiral 302, such mapping is spatially and temporally coherent. In particular, such mapping is distance preserving. The mapping is also unique for any two points located on the spiral 302. Furthermore, for any three points located on the spiral 302, the distance relationship in the 3D space is the same as the distance relationship along the spiral 302 (i.e., in the 1D space). For example, when point B lays between points A and C on the spiral 302, the mapping is such that the distance, in the 3D space, between points A and C is larger than the distance between points A and B and is also larger than the distance between points B and C. These properties resulting from the spatial and temporal coherency of the mapping are typically beneficial for achieving efficient compression, e.g., in JPEG, HEVC, MP4, and many other formats, and for inhibiting manifestations of compression artifacts in the decompressed single-channel data computed by the decoder unit 130.

FIG. 4 graphically illustrates the principle of operation of a 1D-to-3D mapper that can be used in the block 206 of the encoding method 200 according to another embodiment. More specifically, FIG. 4 shows a 3D Peano curve 402 in the Cartesian coordinate system whose axes are labeled $X_1$, $X_2$, and $X_3$, respectively. The granularity of the Peano curve 402 is 2 bits per dimension. In additional embodiments, Peano curves of other granularities can similarly be used. In other additional embodiments, various nD Peano curves may be used to implement the corresponding 1D-to-nD mappers with various granularities, where n=2 or n>3.

The Peano curve 402 is used to map a range [0, D] of scalar values d onto 64 different 3D vectors (Y, Cb, Cr) or (R, G, B). In some examples, a scalar value d (D≥d≥0) is mapped onto the curve 402 by finding the point on the curve whose distance along the curve, from the curve's origin O, is rounded to d. The cartesian coordinates ($x_3$, $x_2$, $x_1$) of the found point are then used to determine the corresponding values of Y, Cb, and Cr, respectively, or of R, G, and B, respectively, for the pixel in question.

A Peano curve, such as the Peano curve 402, is an example of a space-filling curve (with endpoints) whose range covers the entire range of the corresponding n-dimensional hypercube. Other space-filling curve examples include but are not limited to Hilbert curves and Morton curves. Space-filling curves are special cases of fractal curves. Various 1D-to-nD mappers suitable for implementing the block 206 of the encoding method 200 can be constructed using various suitable space-filling and/or fractal curves (with endpoints) in a manner similar to that described above in reference to the Peano curve 402 and FIG. 4.

Figure 5A:
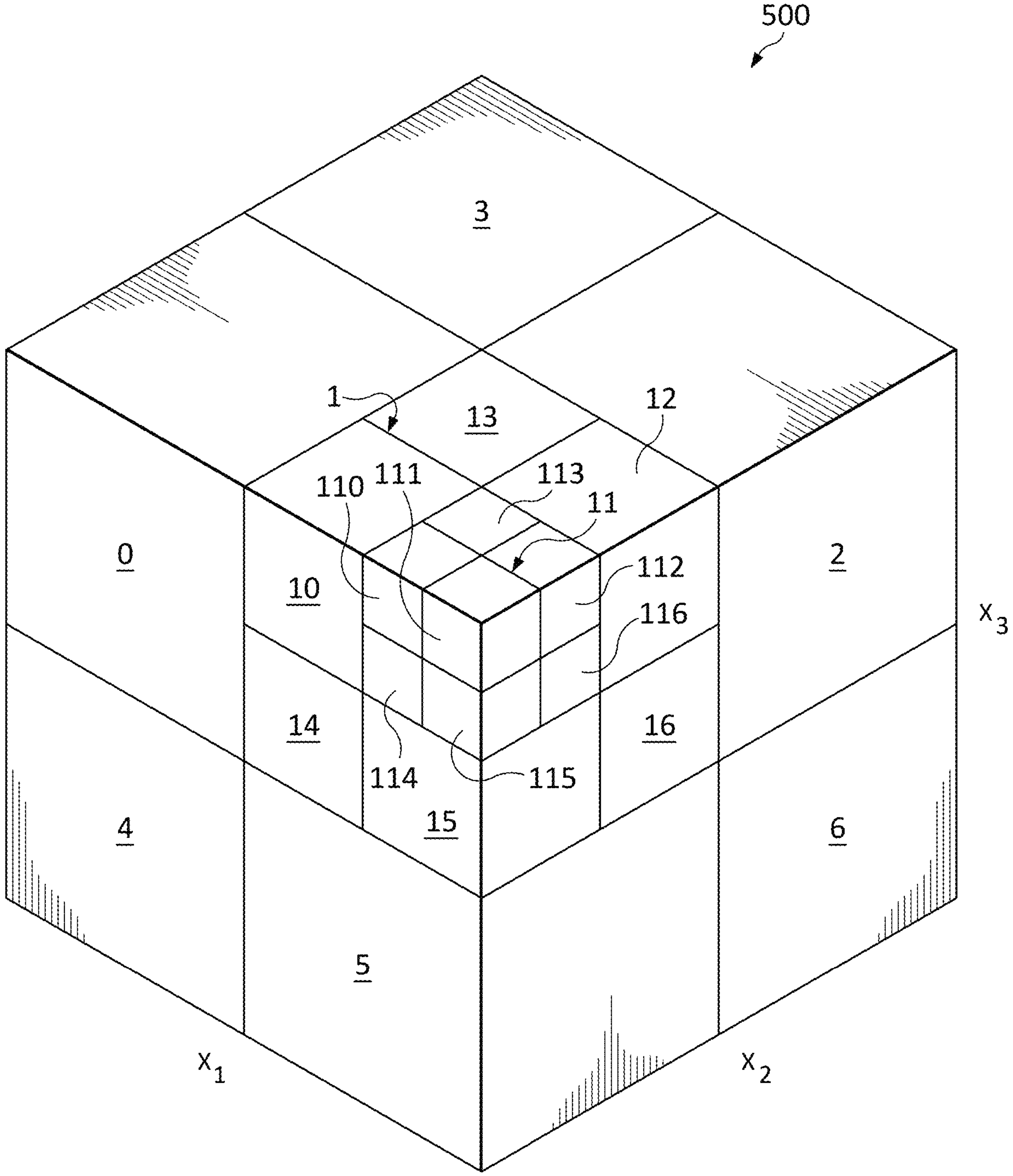
FIGS. 5A-5B graphically illustrate the principle of operation of a 1D-to-3D mapper that can be used in the encoding method of FIG. 2 according to yet another embodiment.
Figure 5B:
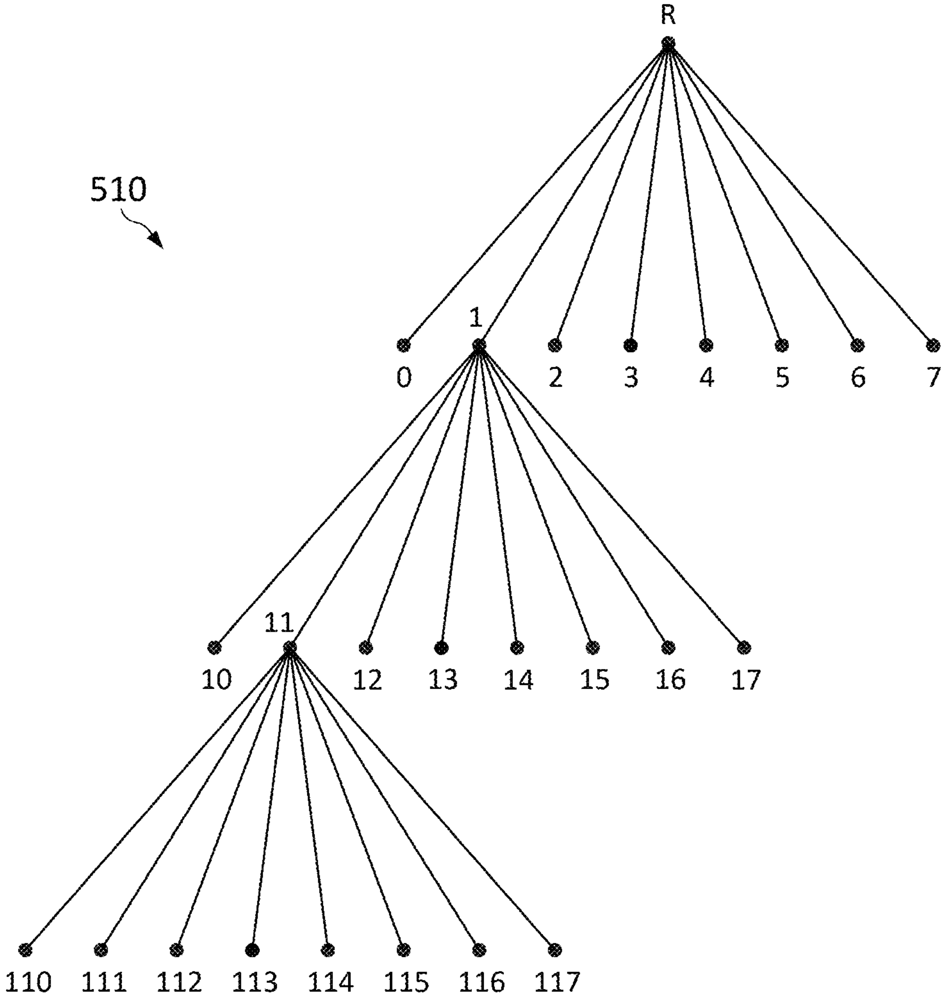

FIGS. 5A-5B graphically illustrate the principle of operation of a 1D-to-3D mapper that can be used in the block 206 of the encoding method 200 according to yet another embodiment. More specifically, FIG. 5A is a diagram illustrating an octree-partitioned 3D cube 500. FIG. 5B is a diagram illustrating an octree 510 used for the partitioning of the 3D cube 500.

In general, an octree, such as the octree 510 of FIG. 5B, is a tree data structure in which each internal node has exactly eight children. Octrees can be used to partition a bounded three-dimensional space (such as the 3D cube 500) by recursively subdividing the bounded space into eight octants. In a point-region (PR) octree, the node stores an explicit three-dimensional point, which is the "center" of the subdivision for that node. This center point defines one of the respective corners for each of the eight children. In a matrix-based (MX) octree, the subdivision point is implicitly the center of the space the node represents. The root node of a PR octree can represent infinite space. The root node of an MX octree represents a finite bounded space so that the implicit centers are well-defined. For example, the root node R of the octree 510 (see FIG. 5B) represents the 3D cube 500. The octree 510 is an example of a $2^n$-way tree for which n=3. A person of ordinary skill in the pertinent art will readily understand how to construct various $2^n$-way trees for other values of n without any undue experimentation. In additional examples, the value of n is 2, 4, 5, and so on.

The eight children of the root node R of the octree 510 are the nodes 0 through 7 (see FIG. 5B). The subcubes (octants) of the 3D cube 500 corresponding to the child nodes 0-7 are similarly labeled 0 through 7 in FIG. 5A. The subcube 7 is not directly visible in the view shown in FIG. 5A. For illustration purposes, only the children of the child node 1 are explicitly shown in FIG. 5B. These grandchild nodes are labeled 10 through 17 in FIG. 5B. The subcubes (octants) of the subcube 1 corresponding to the grandchild nodes 10-17 are similarly labeled 10 through 17 in FIG. 5A. The subcube 17 is not directly visible in the view shown in FIG. 5A. For illustration purposes, only the children of the grandchild node 11 are explicitly shown in FIG. 5B. These great-grandchild nodes are labeled 110 through 117 in FIG. 5B. The subcubes (octants) of the subcube 11 corresponding to the great-grandchild nodes 110-117 are similarly labeled 110 through 117 in FIG. 5A. The subcube 117 is not directly visible in the view shown in FIG. 5A. A person of ordinary skill in the pertinent art will readily understand that each of the child nodes 0 and 2-7 similarly has grandchild nodes that similarly have great-grandchild nodes (not explicitly shown in FIG. 5A). A person of ordinary skill in the pertinent art will further understand that each of the grandchild nodes 10 and 12-17 similarly has great-grandchild nodes (not explicitly shown in FIG. 5A). There is a total of 256 great-grandchild nodes in the octree 510. There is also a total of 256 corresponding great-grandchild subcubes in the 3D cube 500. The 256 great-grandchild subcubes partition the 3D cube 500 into 256 nonoverlapping portions, each having the shape of a cube.

In some specific examples, to implement a 1D-to-3D mapper for the block 206 of the encoding method 200, the three dimensions $X_1$, $X_2$, and $X_3$ of the 3D cube 500 are assigned to represent the R, G, and B pixel values or the Y, Cb, and Cr pixel values, respectively. The range [0, D] of the scalar d values is divided into 256 intervals. Each of the intervals is assigned to a respective one of the 256 great-grandchild subcubes of the 3D cube 500. The cartesian coordinates ($x_3$, $x_2$, $x_1$) of the center of the corresponding great-grandchild subcube are then used to determine the R, G, B (or Y, Cb, and Cr) pixel values for the scalar d value that is being mapped. In some specific instances, the above-explained relationship between the scalar d value and the coordinates ($x_3$, $x_2$, $x_1$) of the sub-cube's center is precomputed and tabulated in a corresponding LUT, which is then accessed by the encoder to perform the pertinent operations in the block 206.

In various examples, the octree encoding granularity, i.e., the number of subcubes in the 3D cube 500, is selected based on the desired accuracy and compression ratio intended for the encoder. The finer the cube's subdivision, the more likely for the lossy compression performed in the block 212 of the encoding method 200 to result in an error during the corresponding decoding performed in the decoding unit 130 (also see FIG. 6). Thus, the selection of the octree encoding granularity may also need to be based on the error amount introduced by the lossy compression.

Figure 6:
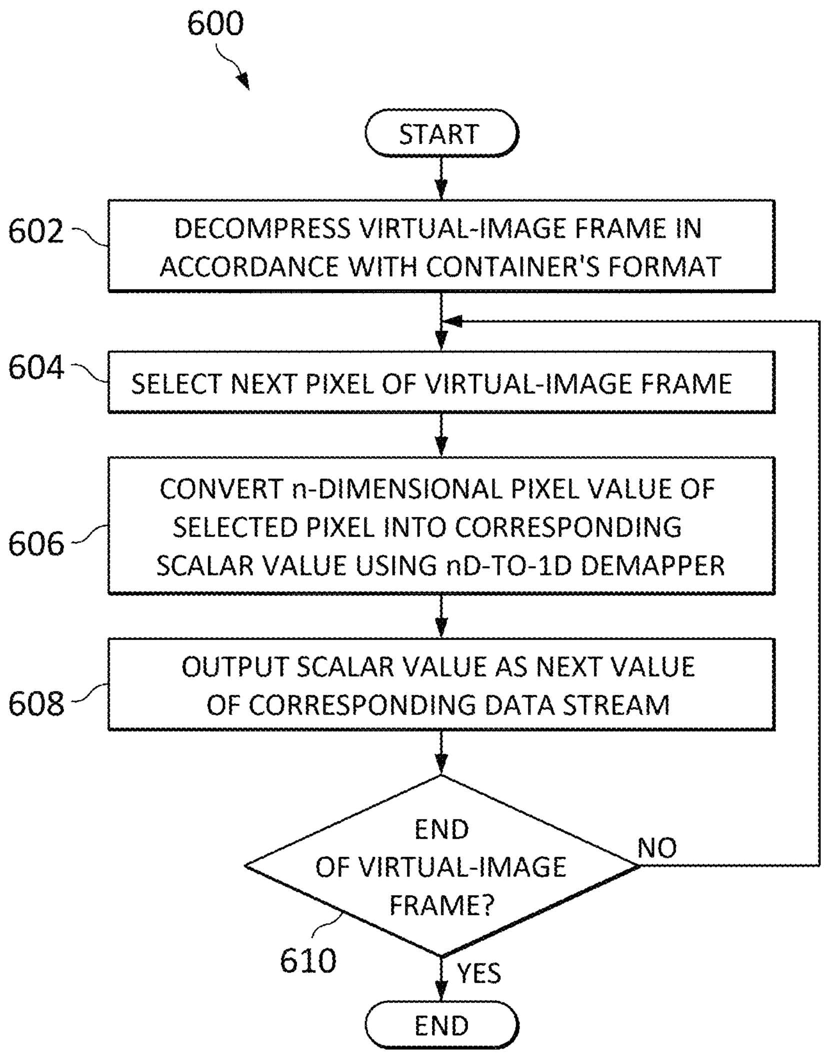
FIG. 6 is a flowchart of a decoding method that can be used in the video/image delivery pipeline of FIG. 1 according to an embodiment.

FIG. 6 is a flowchart of a decoding method 600 that can be used in the decoding unit 130 according to an embodiment. The decoding method 600 and the encoding method 200 are compatible with one another. As such, the decoding method 600 enables substantial recovery of the single-channel data stream encoded for transmission using the selected multi-channel container format and the encoding method 200.

The decoding method 600 comprises decompressing a compressed virtual-image frame in accordance with the container format (in block 602). The decompression performed in the block 602 is an inverse operation to the compression performed in the block 212 of the encoding method 200.

The decoding method 600 also comprises selecting a next pixel of the decompressed virtual-image frame and reading the nD pixel value of the selected pixel (in block 604). In a representative example, the selecting operation in the block 604 of the decoding method 600 is implemented similar to the selecting operation of the block 204 of the above-described encoding method 200. As such, the reader is referred to the above description of the block 204 for pertinent details of the pixel selection process.

The decoding method 600 also comprises converting (in block 606) the nD pixel value read in the block 604 into a corresponding scalar value using a properly selected nD-to-1D demapper. The selected nD-to-1D demapper is such that the demapping performed thereby is inverse to the mapping performed by the 1D-to-nD mapper used in the block 206 of the encoding method 200. In at least some examples, the nD-to-1D demapper used in the block 606 of the decoding method 600 and the 1D-to-nD mapper used in the block 206 of the encoding method 200 are implemented based on the same LUT. More specifically, the nD-to-1D demapper used in the block 606 is configured to look up a scalar value in that LUT based on the provided nD value, whereas the 1D-to-nD mapper used in the block 206 of the encoding method 200 is configured to look up an nD value in the same LUT based on the provided scalar value. In various examples, the nD-to-1D demapper operates to account for errors introduced by lossy compression. For example, when the virtual-frame pixel RGB value (100, 200, 30) comes out after decoding as the RGB value of (94, 203, 31) due to errors introduced by lossy compression, the nD-to-1D demapper operates to correct the errors to return the original (100, 200, 30) RGB value. Such error correction is achieved, e.g., by selecting the granularity of the 1D-to-nD mapping in such a way that the a typical scatter of the decoded points around the original constellation point is within the range closest (e.g., in the Euclidean distance sense) to the original constellation point as opposed to some other constellation point. This feature of the demapper is often referred to as the maximum likelihood detection.

The decoding method 600 also comprises outputting (in block 608) the scalar value determined in the block 606 as the next value of a corresponding data stream (data sequence). In the absence of losses and/or significant compression artifacts, the latter data stream is a copy or an approximate copy of the data stream received in the block 202 of the encoding method 200.

The decoding method 600 also comprises determining (in decision block 610) whether or not the end of the corresponding virtual-image frame has been reached. When it is determined that the end of the frame has not been reached ("No" at the decision block 610), operations of the decoding method 600 loop back to the block 604. Otherwise ("Yes" at the decision block 610), the decoding method 600 is terminated.

Figure 7:
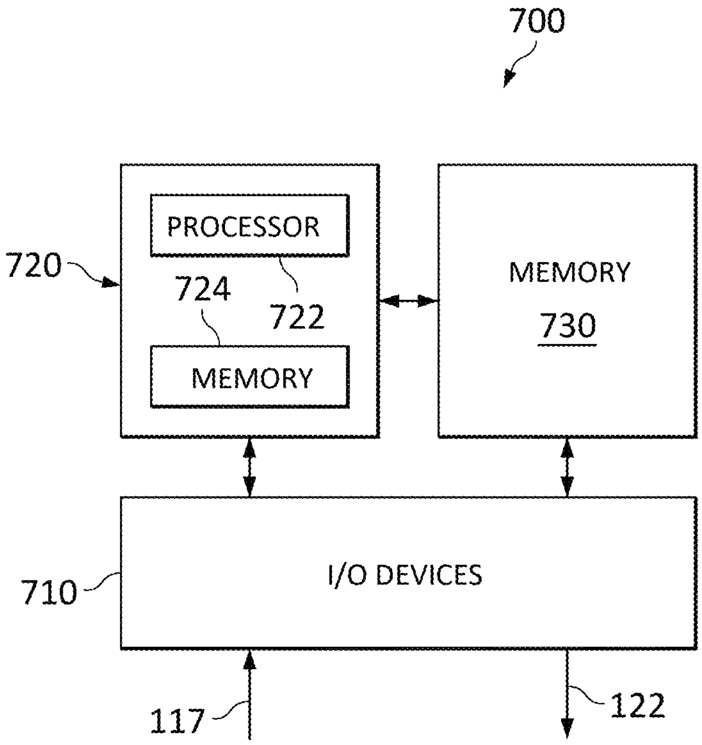
FIG. 7 is a block diagram illustrating a computing device according to an embodiment.

FIG. 7 is a block diagram illustrating a computing device 700 according to an embodiment. The device 700 can be used, e.g., in the coding block 120. A computing device similar to the device 700 can also be used in the decoding unit 130. Based on the following description of the device 700, a person of ordinary skill in the pertinent art will readily understand how to make, configure, and use a similar computing device for the decoding unit 130.

The device 700 comprises input/output (I/O) devices 710, a coding engine 720, and a memory 730. The I/O devices 710 may be used to enable the device 700 to receive at least a portion of the video/image stream 117 and to output at least a portion of the coded bitstream 122. The memory 730 may have buffers to receive image data to be encoded and compressed, e.g., by way of the video/image stream 117. The received image data may include, inter alia, the above described single-channel data streams. Once the data are buffered, the memory 730 may provide parts of the data to the coding engine 720 for processing therein. The coding engine 720 includes a processor 722 and a memory 724. The memory 724 may store therein program code, which when executed by the processor 722 enables the coding engine 720 to perform various coding operations, including but not limited to the various coding operations described above in reference to some or all of FIGS. 2-5. The memory 724 may also store therein the above described LUTs that can be accessed by the processor 722 as needed.

Various aspects of the present invention may be further appreciated from the following enumerated example embodiments (EEEs)

EEE (1): A coding method, comprising: converting, with a processor, a plurality of scalar values of a received data stream into a corresponding plurality of n-dimensional values, the converting being performed using a mapper; assigning, with the processor, each of the n-dimensional values as a pixel value of a respective pixel of a virtual-image frame, where n is an integer greater than one; and compressing, with the processor, the virtual-image frame according to a type of a container for image data; and wherein the mapper is configured to map a scalar value to a corresponding n-dimensional value based on a relationship represented by an n-dimensional curve or by a plurality of $2^n$-way tree partitions of n-dimensional space. Herein, a straight n-dimensional line is not an example of the recited "n-dimensional curve." For example, a "curve" includes at least two portions that are not colinear with one another in the corresponding n-dimensional space.

EEE (2): The method of EEE (1), wherein n is greater than three.

EEE (3): The method of EEE (1) or EEE (2), wherein the corresponding n-dimensional value is a set including a red value, a green value, and a blue value, or a set including a cyan value, a magenta value, and a yellow value, or a set including a luminance value, a blue-difference chroma value, and a red-difference chroma value.

EEE (4): The method of any one of EEE (1) to EEE (3), wherein the plurality of scalar values are depth data, vertex data, or index data representing a 3-dimensional scene.

EEE (5): The method of EEE (1), EEE (3), or EEE (4), wherein the n-dimensional curve is a spiral; and wherein n=2 or n=3.

EEE (6): The method of any one of EEE (1) to EEE (5), wherein the n-dimensional curve is a space-filling curve with two endpoints.

EEE (7): The method of EEE (6), wherein the space-filling curve is selected from the group consisting of a Peano curve, a Hilbert curve, a Morton curve, and a fractal curve.

EEE (8): The method of any one of EEE (1) to EEE (6), wherein the mapper is configured to determine the corresponding n-dimensional value by: finding a location on the n-dimensional curve having a distance from an endpoint thereof representing the scalar value, the distance being along the n-dimensional curve; and representing respective components of the corresponding n-dimensional value by a set of coordinates of the location in the n-dimensional space.

EEE (9): The method of any one of EEE (1) to EEE (5) and EEE (8), wherein the mapper is configured to determine the corresponding n-dimensional value by: identifying one partition of the plurality of $2^n$-way tree partitions representing the scalar value; and representing respective components of the corresponding n-dimensional value by a set of coordinates of the one partition in the n-dimensional space.

EEE (10): The method of any one of EEE (1) to EEE (9), wherein the mapper is configured to use a lookup table precomputed based on the n-dimensional curve or the plurality of $2^n$-way tree partitions of the n-dimensional space.

EEE (11): The method of any one of EEE (1) to EEE (10), further comprising: decompressing, with the processor or with another processor, a compressed image frame to generate a decompressed image frame, the decompressing being performed according to the type of the container, the compressed image frame having been generated by the compressing; and transforming, with the processor or with the another processor, a plurality of n-dimensional pixel values of the decompressed image frame into another plurality of scalar values, the transforming being performed using a demapper; and wherein the demapper is configured to perform a demapping operation that is inverse to a corresponding mapping operation of the mapper.

EEE (12): The method of EEE (11), wherein both the mapper and the demapper are configured to use a same lookup table precomputed based on the n-dimensional curve or the plurality of $2^n$-way tree partitions of the n-dimensional space.

EEE (13): A non-transitory computer-readable medium storing instructions that, when executed by an electronic processor, cause the electronic processor to perform operations comprising any one of EEE (1) to EEE (12).

EEE (14): An apparatus for coding image data, the apparatus comprising: at least one processor; and at least one memory including program code; wherein the at least one memory and the program code are configured to, with the at least one processor, cause the apparatus at least to: convert, with an electronic mapper, a plurality of scalar values of a received data stream into a corresponding plurality of n-dimensional values; assign each of the n-dimensional values as a pixel value of a respective pixel of a virtual-image frame, where n is an integer greater than one; and compress the virtual-image frame according to a type of a container for the image data; and wherein the electronic mapper is configured to map a scalar value onto a corresponding n-dimensional value based on a relationship represented by an n-dimensional curve or by a plurality of $2^n$-way tree partitions of n-dimensional space.

EEE (15): The apparatus of EEE (14), wherein the electronic mapper is configured to: find a location on the n-dimensional curve having a distance from an endpoint thereof representing the scalar value, the distance being along the n-dimensional curve; and represent respective components of the corresponding n-dimensional value by a set of coordinates of the location in the n-dimensional space.

EEE (16): The apparatus of EEE (14), wherein the electronic mapper is configured to: identify one partition of the plurality of $2^n$-way tree partitions representing the scalar value; and represent respective components of the corresponding n-dimensional value by a set of coordinates of the one partition in the n-dimensional space.

EEE (17): The apparatus of any one of EEE (14) to EEE (16), wherein electronic mapper is configured to use a lookup table precomputed based on the n-dimensional curve or the plurality of $2^n$-way tree partitions of the n-dimensional space.

EEE (18): The apparatus of any one of EEE (14) to EEE (17), wherein the at least one memory and the program code are configured to, with the at least one processor, further cause the apparatus to: generate a decompressed image frame by decompressing a compressed image frame according to the type of the container; and transform, with an electronic demapper, a plurality of n-dimensional pixel values of the decompressed image frame into another plurality of scalar values; and wherein the electronic demapper is configured to perform a demapping operation that is inverse to a corresponding mapping operation of the electronic mapper.

EEE (19): The apparatus of EEE (18), wherein both the electronic mapper and the electronic demapper are configured to use a common (e.g., a respective copy of the same) lookup table precomputed based on the n-dimensional curve or the plurality of $2^n$-way tree partitions of the n-dimensional space.

EEE (20): The apparatus of any one of EEE (14) to EEE (19), wherein the plurality of scalar values are depth data, vertex data, or index data representing a 3-dimensional scene.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in fewer than all features of a single disclosed embodiment. Thus, the following claims are hereby incorporated into the Detailed Description, with each claim standing on its own as a separately claimed subject matter.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing various embodiments described herein. Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing various embodiments described herein. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or additional embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the terms "compatible" and "in accordance with" mean that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the terms "circuit," "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams and flowcharts herein represent conceptual views of illustrative circuitry embodying the principles of the disclosure. Similarly, it will be appreciated that any flowcharts, flow diagrams, state transition diagrams, pseudo code, and the like represent various processes which may be substantially represented in a computer readable medium and so executed by a computer or processor, whether or not such computer or processor is explicitly shown.

"BRIEF SUMMARY OF SOME SPECIFIC EMBODIMENTS" in this specification is intended to introduce some example embodiments, with additional embodiments being described in "DETAILED DESCRIPTION" and/or in reference to one or more drawings. "BRIEF SUMMARY OF SOME SPECIFIC EMBODIMENTS" is not intended to identify essential elements or features of the claimed subject matter, nor is it intended to limit the scope of the claimed subject matter.

What is claimed is:

1. A coding method for encoding a single-channel data stream into an n-channel image container, comprising:

converting, with a processor, a plurality of scalar values of a received single-channel data stream into a corresponding plurality of n-dimensional values, where n is an integer greater than one and depends on a format of an n-channel image container used for the encoding, the converting being performed using a mapper;

assigning, with the processor, each of the n-dimensional values as a pixel value to a respective pixel of a virtual-image frame; and compressing, with the processor, the virtual-image frame according to an n-channel image container format; and wherein the mapper is configured to map each of the scalar values to a corresponding n-dimensional value based on a mapping relationship represented by an n-dimensional curve or by a plurality of $2^n$-way tree partitions of n-dimensional space, wherein the mapping relationship comprises, for each of the scalar values, finding a location on the n-dimensional curve having a distance from an endpoint thereof or a partition of the plurality of $2^n$-way tree partitions representing the scalar value, the distance being measured along the n-dimensional curve; and representing respective components of the corresponding n-dimensional value by a set of coordinates of the location or partition in the n-dimensional space.

2. The method of claim 1, wherein n is greater than three.

3. The method of claim 1, wherein the corresponding n-dimensional value is a set including a red value, a green value, and a blue value, or a set including a cyan value, a magenta value, and a yellow value, or a set including a luminance value, a blue-difference chroma value, and a red-difference chroma value.

4. The method of claim 1, wherein the plurality of scalar values are depth data, vertex data, or index data representing a 3-dimensional scene.

5. The method of claim 1, wherein the n-dimensional curve is a spiral and n=2 or n=3.

6. The method of claim 1, wherein the n-dimensional curve is a space-filling curve with two endpoints.

7. The method of claim 6, wherein the space-filling curve is selected from the group consisting of a Peano curve, a Hilbert curve, a Morton curve, and a fractal curve.

8. The method of claim 1, wherein the mapper is configured to use a lookup table precomputed based on the n-dimensional curve or the plurality of $2^n$-way tree partitions of the n-dimensional space.

9. The method of claim 1, further comprising:

decompressing, with the processor or with another processor, a compressed image frame to generate a decompressed image frame, the decompressing being performed according to the container format, the compressed image frame having been generated by the compressing; and transforming, with the processor or with the another processor, a plurality of n-dimensional pixel values of the decompressed image frame into another plurality of scalar values, the transforming being performed using a demapper; and wherein the demapper is configured to perform a demapping operation that is inverse to a corresponding mapping operation of the mapper.

10. The method of claim 9, wherein both the mapper and the demapper are configured to use a common lookup table precomputed based on the n-dimensional curve or the plurality of $2^n$-way tree partitions of the n-dimensional space.

11. A non-transitory computer-readable medium storing instructions that, when executed by an electronic processor, cause the electronic processor to perform operations for encoding a single-channel data stream into an n-channel image container, the operations comprising:

converting, with a processor, a plurality of scalar values of a received single-channel data stream into a corresponding plurality of n-dimensional values, where n is an integer greater than one and depends on a format of an n-channel image container used for the encoding, the converting being performed using a mapper;

assigning, with the processor, each of the n-dimensional values as a pixel value to a respective pixel of a virtual-image frame; and compressing, with the processor, the virtual-image frame according to an n-channel image container format; and wherein the mapper is configured to map each of the scalar values to a corresponding n-dimensional value based on a mapping relationship represented by an n-dimensional curve or by a plurality of $2^n$-way tree partitions of n-dimensional space, wherein the mapping relationship comprises, for each of the scalar values, finding a location on the n-dimensional curve having a distance from an endpoint thereof or a partition of the plurality of $2^n$-way tree partitions representing the scalar value, the distance being measured along the n-dimensional curve; and representing respective components of the corresponding n-dimensional value by a set of coordinates of the location or partition in the n-dimensional space.

12. An apparatus for coding image data, the apparatus comprising:

at least one processor; and at least one memory including program code;

wherein the at least one memory and the program code are configured to, with the at least one processor, cause the apparatus at least to:

convert, with an electronic mapper, a plurality of scalar values of a received single-channel data stream into a corresponding plurality of n-dimensional values, where n is an integer greater than one and depends on a format of an n-channel image container used for the coding;

assign each of the n-dimensional values as a pixel value to a respective pixel of a virtual-image frame; and compress the virtual-image frame according to an n-channel image container format; and wherein the electronic mapper is configured to map each of the scalar values onto a corresponding n-dimensional value based on a mapping relationship represented by an n-dimensional curve or by a plurality of $2^n$-way tree partitions of n-dimensional space, wherein the mapping relationship comprises, for each of the scalar values, finding a location on the n-dimensional curve having a distance from an endpoint thereof or a partition of the plurality of $2^n$-way tree partitions representing the scalar value, the distance being measured along the n-dimensional curve; and representing respective components of the corresponding n-dimensional value by a set of coordinates of the location or partition in the n-dimensional space.

13. The apparatus of claim 12, wherein the electronic mapper is configured to use a lookup table precomputed based on the n-dimensional curve or the plurality of $2^n$-way tree partitions of the n-dimensional space.

14. The apparatus of claim 12, wherein the at least one memory and the program code are configured to, with the at least one processor, further cause the apparatus to:

generate a decompressed image frame by decompressing a compressed image frame according to the container format; and transform, with an electronic demapper, a plurality of n-dimensional pixel values of the decompressed image frame into another plurality of scalar values; and wherein the electronic demapper is configured to perform a demapping operation that is inverse to a corresponding mapping operation of the electronic mapper.

15. The apparatus of claim 14, wherein both the electronic mapper and the electronic demapper are configured to use a common lookup table precomputed based on the n-dimensional curve or the plurality of $2^n$-way tree partitions of the n-dimensional space.

16. The apparatus of claim 12, wherein the plurality of scalar values are depth data, vertex data, or index data representing a 3-dimensional scene.

* * * * *